(12) United States Patent
Iwamoto et al.

(10) Patent No.: US 9,608,243 B2
(45) Date of Patent: Mar. 28, 2017

(54) ELECTRONIC DEVICE WITH BATTERY TERMINAL SEALING MEMBER

(71) Applicant: PANASONIC INTELLECTUAL PROPERTY MANAGEMENT CO., LTD., Osaka-shi, Osaka (JP)

(72) Inventors: Akira Iwamoto, Osaka (JP); Tadashi Matsunobe, Osaka (JP); Masaru Furujiku, Osaka (JP); Jun Satoh, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/006,807

(22) Filed: Jan. 26, 2016

(65) Prior Publication Data

US 2016/0141568 A1 May 19, 2016

Related U.S. Application Data

(63) Continuation of application No. 13/950,979, filed on Jul. 25, 2013, now Pat. No. 9,276,251.

(30) Foreign Application Priority Data

Dec. 26, 2012 (JP) ................................. 2012-283171

(51) Int. Cl.
*H01M 2/26* (2006.01)
*H01M 2/10* (2006.01)
(Continued)

(52) U.S. Cl.
CPC ........ *H01M 2/1066* (2013.01); *G06F 1/1635* (2013.01); *G06F 1/1656* (2013.01);
(Continued)

(58) Field of Classification Search
CPC .. H01M 2/204; H01M 2/1094; H01M 2/1066; G06F 1/1635; G06F 1/1656
(Continued)

(56) References Cited

U.S. PATENT DOCUMENTS

2002/0022399 A1 2/2002 Ninomiya
2003/0085686 A1 5/2003 Haga et al.
(Continued)

FOREIGN PATENT DOCUMENTS

CN 1339831 3/2002
CN 1411093 4/2003
(Continued)

OTHER PUBLICATIONS

Office Action issued in corresponding Chinese Application No. 201310717960.5 on Aug. 18, 2015 and corresponding English translation.
(Continued)

*Primary Examiner* — Gary Harris
(74) *Attorney, Agent, or Firm* — Hamre, Schumaan, Mueller & Larson, P.C.

(57) ABSTRACT

There is provided an electronic device includes a detachable battery pack from a casing; and a battery pack loading section in which the battery pack is loaded. The battery pack loading section includes a battery receiving surface that receives a battery and a peripheral wall that is formed at the peripheral edge of the battery receiving surface and faces the side surface of the battery. A connector to be connected to a battery terminal of the battery pack is disposed on the peripheral wall. A raised portion that is raised toward the battery pack is formed on the battery receiving surface and on the peripheral wall in the battery pack loading section. The battery pack has an elastic sealing member surrounding the battery terminal at a portion in contact with the raised portion in a manner disposed in the battery pack loading section.

4 Claims, 6 Drawing Sheets

(51) Int. Cl.
*H01M 2/20* (2006.01)
*G06F 1/16* (2006.01)
*H01M 2/30* (2006.01)

(52) U.S. Cl.
CPC ......... *H01M 2/1094* (2013.01); *H01M 2/204* (2013.01); *H01M 2/30* (2013.01); *H01M 2220/30* (2013.01)

(58) Field of Classification Search
USPC ........................................................ 429/121
See application file for complete search history.

(56) References Cited

U.S. PATENT DOCUMENTS

| | | | |
|---|---|---|---|
| 2006/0063064 A1 | 3/2006 | Ishihara et al. | |
| 2008/0042448 A1 | 2/2008 | Ge et al. | |
| 2012/0150248 A1* | 6/2012 | Chi ...................... | A61N 1/3975 607/5 |

FOREIGN PATENT DOCUMENTS

| | | |
|---|---|---|
| CN | 1780026 | 5/2006 |
| JP | 05-259962 | 10/1993 |
| JP | 2002-75311 | 3/2002 |
| JP | 2002-260607 | 9/2002 |
| JP | 2007-035279 | 2/2007 |

OTHER PUBLICATIONS

Office Action issued in corresponding Japanese Patent Application No. 2012-283171, May 10, 2016.
Office Action issued in Japanese Patent Application No. 2012-283171, dated Oct. 11, 2016, total 2 pages.

* cited by examiner

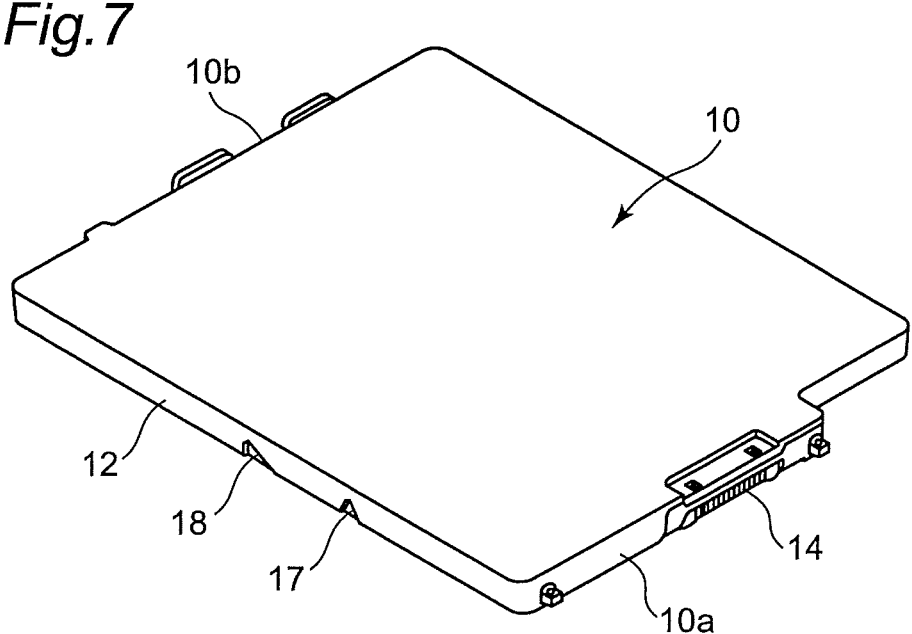
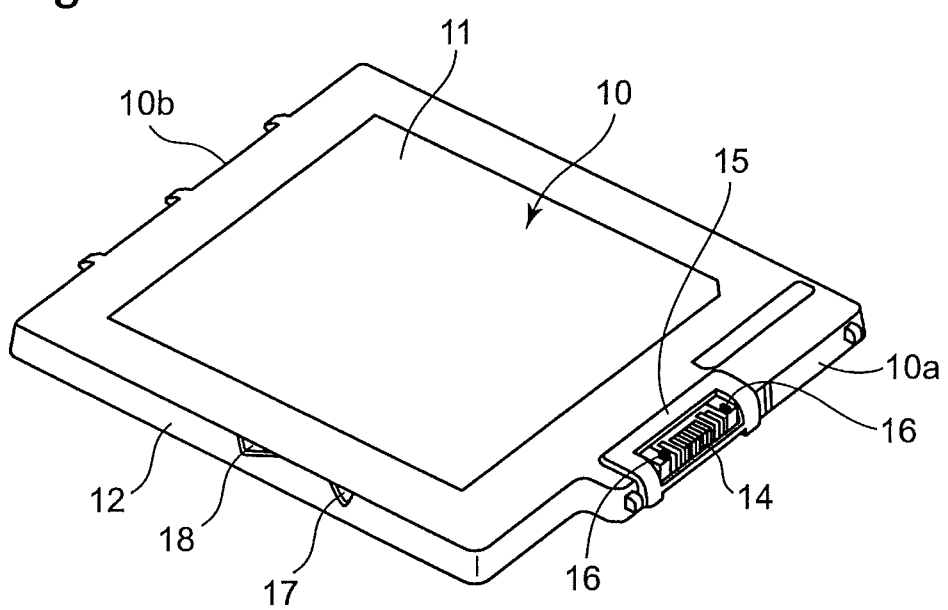

ELECTRONIC DEVICE WITH BATTERY TERMINAL SEALING MEMBER

BACKGROUND OF THE INVENTION

Field of the Invention

The present disclosure relates to an electronic device and, more particularly, to an electronic device equipped with a detachable battery.

Description of the Related Art

As well known, an electronic device such as a personal computer and an information terminal device, in particular, a portable electronic device such as a so-called tablet type or a notebook type computer and a tablet type mobile information terminal is generally used in the state in which a detachable battery is loaded at a battery loading section in a device casing.

Such a battery loading section includes a connector to be connected to an electric terminal (i.e., a battery terminal) of the loaded battery. A waterproof structure may be provided for waterproofing a connected portion between the connector of the battery loading section and the battery terminal (refer to Japanese Patent Laid-open Publication No. 2007-35279, for example). The above-described waterproof structure is important particularly for portable electronic device, and more particularly, for electronic device in which a battery is used on exposure to the outside without any cover for covering the battery loading section.

SUMMARY OF THE INVENTION

In providing the device with the above-described waterproof structure, as the configurations of the connected portion between the connector of the battery loading section and the battery terminal and its periphery become more complicated, cost becomes higher, and further, a battery loading operation and the like for obtaining a waterproofing effect is likely to become more complicated.

To cope therewith, One non-limiting and exemplary embodiment provides an electronic device capable of obtaining a waterproofing effect with as a simple configuration as possible and by as an easy battery loading operation as possible, in the electronic device in which a detachable battery is loaded in a battery loading section in a device casing when it is used.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

According to one general aspect of the present disclosure, there is provided an electronic device comprising: a detachable battery from a casing; and a battery loading section in which the battery is loaded, the battery loading section including a battery receiving surface that receives the battery to be mounted and a peripheral wall that is formed at a peripheral edge of the battery receiving surface and faces side surfaces of the battery, wherein a connector to be connected to a battery terminal of the battery is disposed on the peripheral wall, a raised portion that is raised toward the battery to be mounted and surrounds the connector is formed on the battery receiving surface and on the peripheral wall in the battery loading section, and the battery includes an elastic sealing member surrounding the battery terminal at a portion in contact with the raised portion in a state where the battery is loaded in the battery loading section.

With the electronic device according to the present disclosure, the portion surrounding the connector, of the battery receiving surface and peripheral wall of the battery loading section is constituted of the raised portion that is raised toward the battery to be mounted, thereby reducing a risk of water immersion at the connector from the surroundings of the raised portion surrounding the connector. In the state where the battery is loaded in the battery loading section, the sealing member surrounding the battery terminal is pushed against the raised portion of the battery loading section, and therefore, the sealing function of the sealing member can produce a higher waterproofing effect. In this case, the portion surrounding the connector, of the battery receiving surface and peripheral wall of the battery loading section is formed in such a manner as to be raised toward the battery, and further, the sealing member surrounding the battery terminal is disposed at a portion of the battery, corresponding to the raised portion. This relatively simple configuration can produce the waterproofing effect by the relatively easy battery loading operation only for positioning the connector of the battery loading section and the battery terminal to each other so as to dispose the battery.

BRIEF DESCRIPTION OF THE DRAWINGS

FIG. 7 is a perspective view illustrating the battery pack on a back side;

FIG. 8 is a perspective view illustrating the battery pack on a mount surface side;

DETAILED DESCRIPTION

Figure 1:
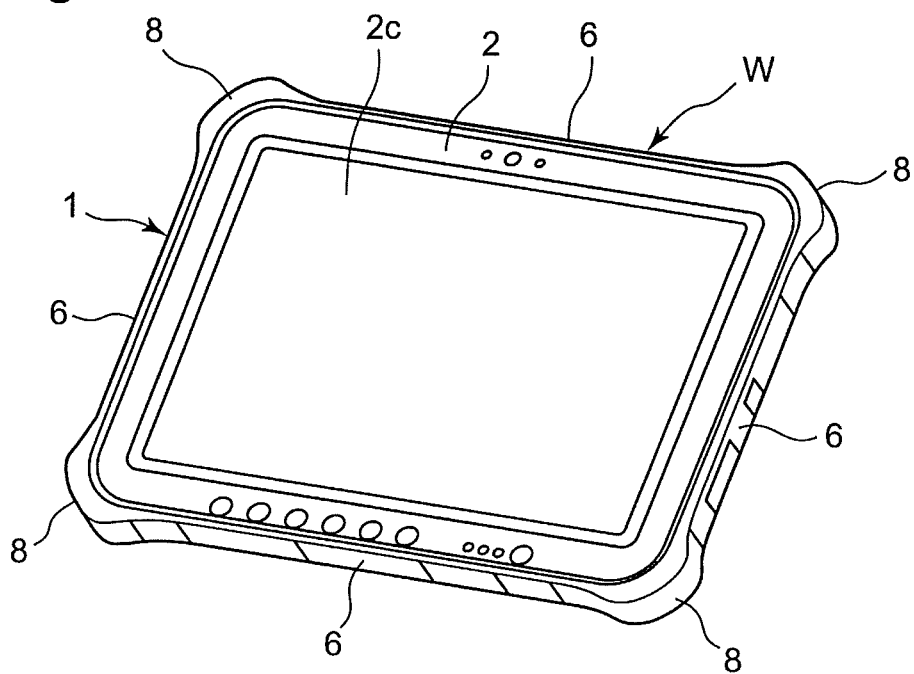
FIG. 1 is a perspective view illustrating a tablet terminal device on a display screen side according to an embodiment of the present disclosure.

An electronic device according to the present disclosure can be embodied in aspects below in addition to the aforementioned basic structure. Specifically, the connector may be disposed at a portion corresponding to a recess formed on a part of the peripheral wall, a protrusion that protrudes toward the recess when the battery is loaded in the battery loading section is formed between the battery terminal and the sealing member in the battery, and the protrusion is located between the peripheral edge of the recess and the connector when the battery is loaded in the battery loading section.

With this structure, when the battery is loaded in the battery loading section, the protrusion disposed between the battery terminal of the battery and the sealing member is located between the peripheral edge of the recess and the connector in the battery loading section, so that the operation of the battery terminal is guided by the protrusion. Consequently, damages can be effectively prevented from being caused by the interference of the battery terminal with the connector of the battery loading section.

Further, in the aforementioned case, a groove having an inclined surface may be formed at a side surface perpendicularly crossing a side, on which the battery terminal of the battery is disposed, an engagement guide that engages with the inclined surface of the groove may disposed at a portion corresponding to the groove on the peripheral wall of the battery loading section, and the inclined surface and the engagement guide may engage with each other when the battery is loaded in the battery loading section, thereby the battery is guided toward the side on which the battery terminal thereof is disposed.

With this structure, when the battery is loaded in the battery loading section, the inclined surface of the groove formed at the side surface of the battery engages with the engagement guide disposed on the peripheral wall of the battery loading section, so that the battery is pushed along the inclined surface toward one side on which the battery terminal is disposed. That is to say, a user can apply force in a proper direction, in which the sealing member of the battery is pushed against the projection of the battery loading section without special intention.

Further, in the aforementioned case, a water drain path that allows the battery receiving surface and the outside of the battery loading section to communicate with each other may be partly formed on the peripheral wall of the battery loading section.

With this structure, in the case where water stays on the battery receiving surface of the battery loading section, the staying water can be drained to the outside of the battery loading section through the water drain path.

Embodiments

Hereinafter, an embodiment will be described in detail with reference to the drawings, appropriately. However, descriptions in detail more than necessary may be omitted. For example, matters which have been already well known may not be described in detail, and substantially the same configurations may not be described redundantly. This is for avoiding the following descriptions from being unnecessarily redundant and for allowing those skilled in the art to easily understand them.

Further, the present inventor(s) gives the accompanying drawings and the following descriptions for allowing those skilled in the art to sufficiently understand the present disclosure, and the main theme defined in the claims is not intended to be restricted thereby.

Further, in the following description, terms which denote certain directions (such as "upper", "lower", "left", "right" and other terms including these terms, "clockwise", "counterclockwise") may be used, but the use of them is merely for ease of understanding of the disclosure with reference to the drawings, and the present disclosure should not be restrictively understood by the meanings of these terms.

The embodiment of the present disclosure which will be described later is an example where the present disclosure is applied to a so-called tablet type portable information terminal device (hereinafter, appropriately referred to as a "tablet terminal device" or simply referred to as a "device").

Figure 2:
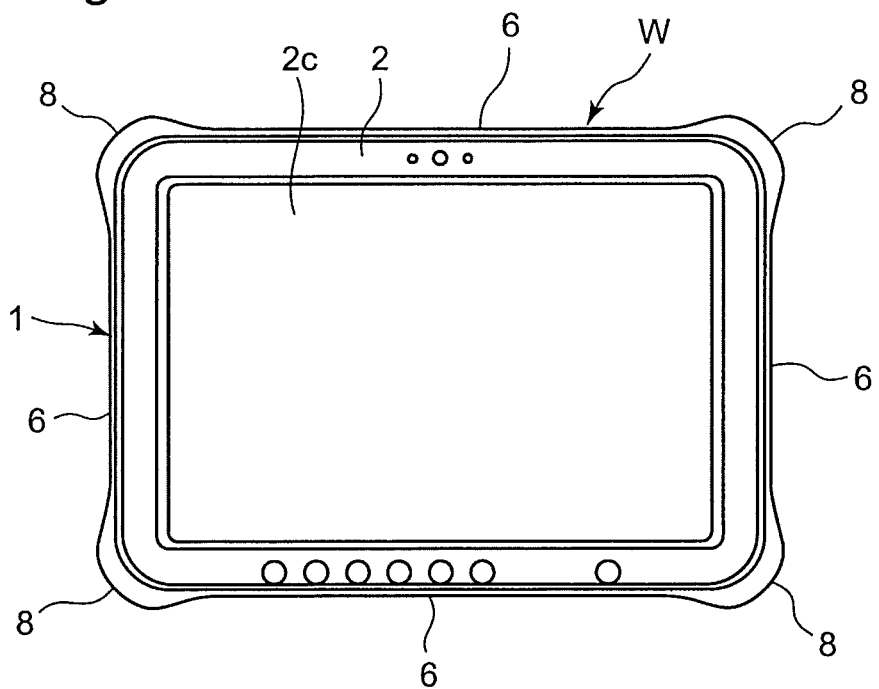
FIG. 2 is a plan view illustrating the tablet terminal device.
Figure 3:
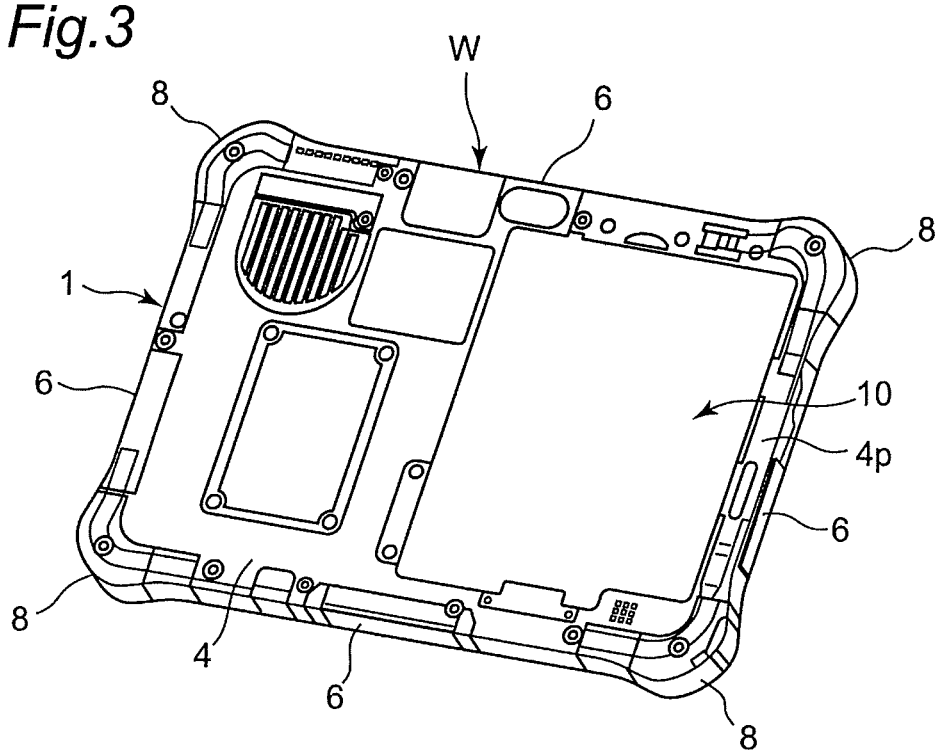
FIG. 3 is a perspective view illustrating the tablet terminal device on a back side.
Figure 4:
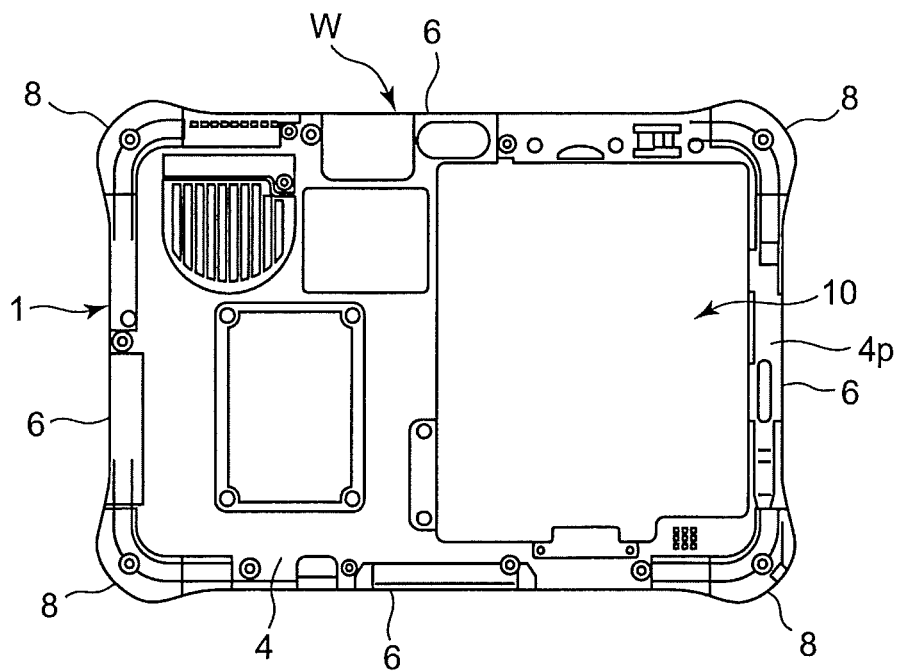
FIG. 4 is a rear view illustrating the tablet terminal device.

FIG. 1 and FIG. 2 are a perspective view and a plan view illustrating a tablet terminal device as the electronic device on a display screen side according to the present embodiment, respectively. Moreover, FIG. 3 and FIG. 4 are a perspective view and a plan view illustrating the tablet terminal device on the back side, respectively.

As illustrated in FIG. 1 to FIG. 4, a tablet terminal device W according to the present embodiment includes a casing 1 that is formed into a substantially quadrangular shape, as viewed on a plane, and has a predetermined thickness (i.e., a predetermined height). The casing 1 has, as its outer surface, an upper surface 2 and a lower surface 4 that are vertically disposed opposite to each other and a side surface 6 for connecting the peripheral edges of the surfaces 2 and 4 to each other. The side surfaces 6 are configured to have two pairs of substantially flat surfaces disposed opposite to each other as essential surfaces.

In the present embodiment, a bulge portion 8 bulging outward of the casing 1 in a curved manner is formed at each of corners of the casing 1, in order to enhance shock resistance when the device W falls down. Essential parts of the casing 1 are made of a metallic material such as magnesium (Mg) so as to secure mechanical rigidity or the like. The four bulge portions 8 are made of a material having a higher elasticity than that of the material of the casing 1, for example, an elastomer. These bulge portions 8 are attached to the corners of the Mg casing 1, and thus, are fixed to the casing 1.

The size and weight of the tablet terminal device W are set so as to ensure the portability thereof. A display screen 2c made of, for example, a liquid crystal is disposed at the upper surface 2 of the casing 1. The display screen 2c is also used as an input screen of a touch panel type. In the meantime, a battery pack 10 serving as a mobile power source is loaded at the lower surface 4 (i.e., a back side) of the casing 1. The battery pack 10 has a predetermined thickness and is formed into a substantially quadrangular shape, as viewed on a plane.

Figure 5:
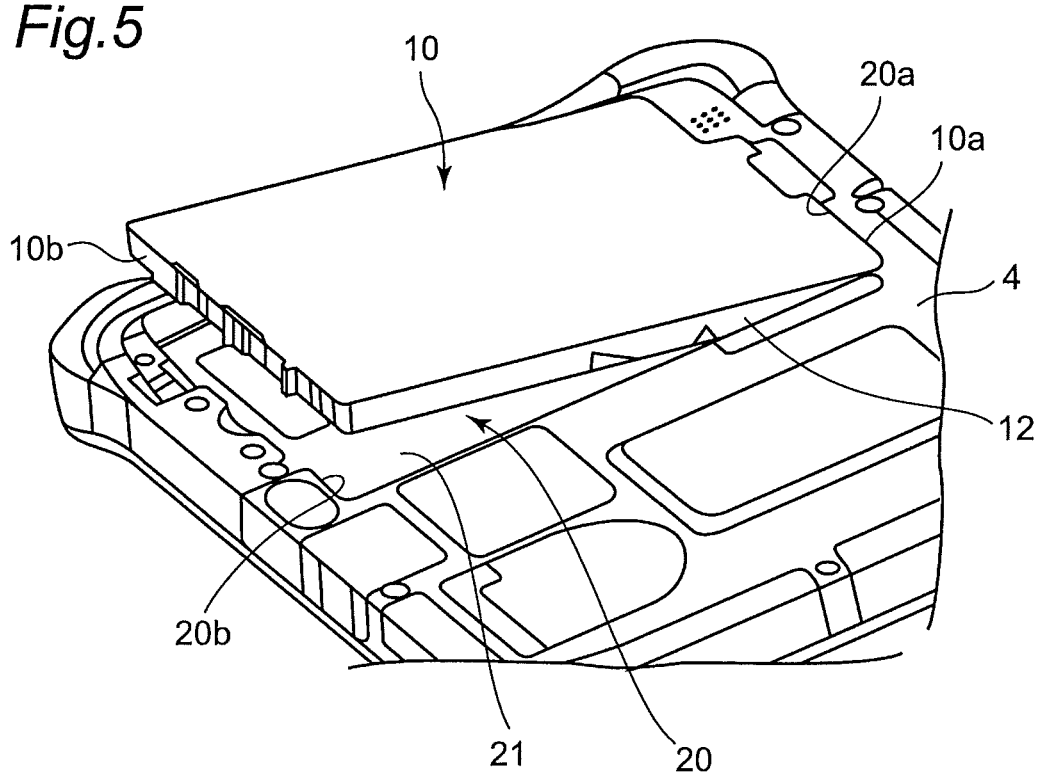
FIG. 5 is a perspective view explaining an operation for loading or unloading a battery pack to or from the battery pack loading section, as viewed on the back side.
Figure 6:
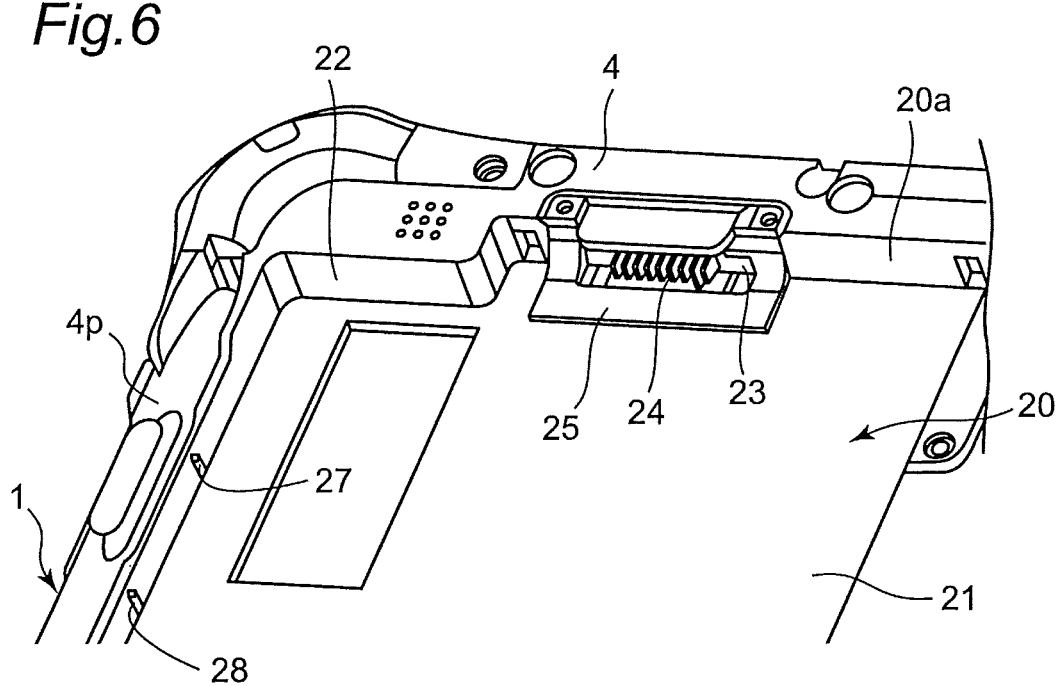
FIG. 6 is a perspective view illustrating the battery pack loading section in the tablet terminal device.
Figure 9:
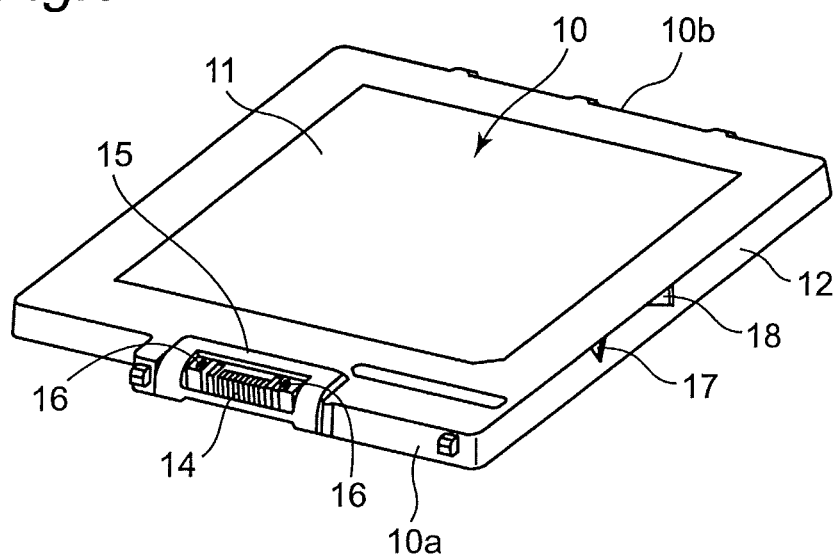
FIG. 9 is a perspective view illustrating the battery pack on the mount surface side, as viewed in a direction different from that of FIG. 8.
Figure 10:
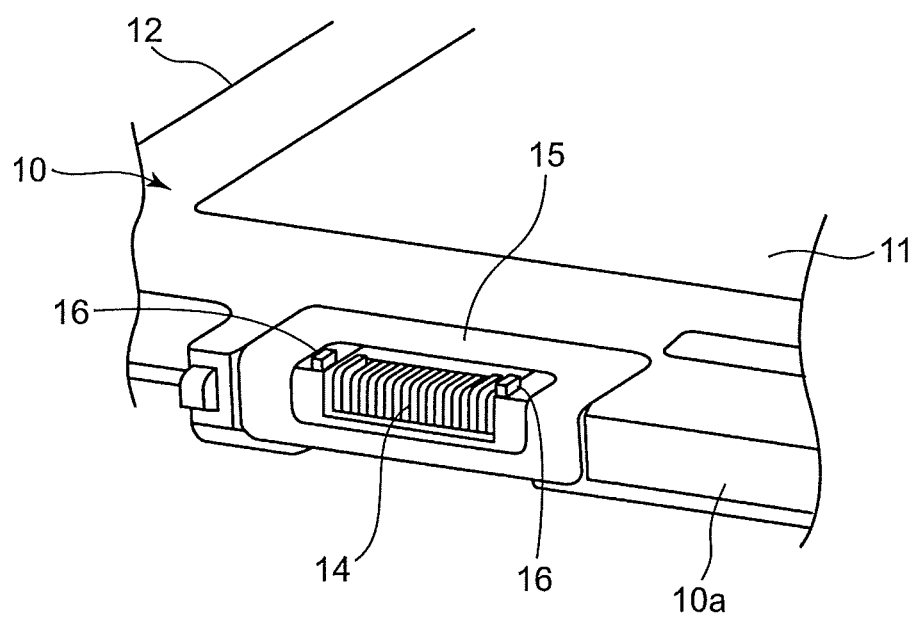
FIG. 10 is an enlarged perspective view illustrating a battery terminal of the battery pack and its surroundings.
Figure 11:
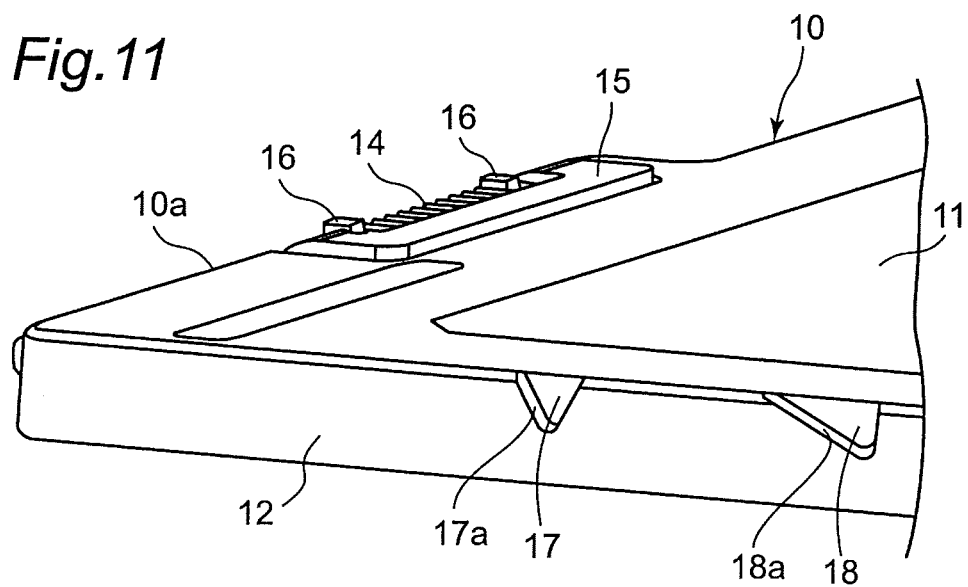
FIG. 11 is an enlarged perspective view illustrating a groove formed on the side surface of the battery pack.

FIG. 5 is a perspective view explaining an operation for loading or unloading the battery pack to or from a battery pack loading section 20 of the casing 1, as viewed on the back side; and FIG. 6 is a perspective view illustrating the battery pack loading section 20. Moreover, FIG. 7 and FIG. 8 are perspective views illustrating the battery pack 10 on the back side and the mount surface side, respectively. FIG. 9 is a perspective view illustrating the battery pack 10 on the mount surface side, as viewed in a direction different from that of FIG. 8. Furthermore, FIG. 10 is an enlarged perspective view illustrating a battery terminal of the battery pack 10 and its surroundings.

As is obvious from FIG. 6, the battery pack loading section 20 provided at the lower surface 4 (i.e., the back side) of the casing 1 has a battery receiving surface 21 that receives a mount surface 11 of the battery pack 10 and a peripheral wall 22 that is formed at the peripheral edge of the battery receiving surface 21 so as to face a side surface 12 of the battery pack 10. The shape and height of the peripheral wall 22 are set so as to contain the battery pack 10 therein without any looseness.

On one side 20a of the battery pack loading section 20 is formed a connector 24 to be connected to a battery terminal 14 (see, for example, FIG. 7) on one side 10a of the battery pack 10. The battery pack 10 can be loaded to or unloaded from the battery pack loading section 20. When the battery pack 10 is loaded in the battery pack loading section 20, the battery terminal 14 of the battery pack 10 is positioned at the connector 24 of the battery pack loading section 20, as shown in FIG. 5, and then, the entire battery pack 10 is kept slantwise in the state in which the other side 10b opposite to the one side 10a of the battery pack 10 and its vicinity are held while the entire battery pack 10 is tilted so as to gradually reduce the inclination angle, and thus, the battery pack 10 is contained on the side 10b thereof inside of the battery pack loading section 20 on the peripheral wall 22 on the other side 20b.

As is obvious from FIG. 3 and FIG. 4, the tablet terminal device W is used in the state in which the battery pack 10 is exposed to the outside without using a cover or the like for covering the battery pack loading section 20. As a consequence, there is provided a waterproof structure for waterproofing a connected portion between the connector 24 of the battery pack loading section 20 and the battery terminal 14. In the present embodiment, a recess 23 is formed at a part of the peripheral wall 22 of one side 20a of the battery pack loading section 20, as shown in FIG. 6. At a portion corresponding to the recess 23 is disposed the connector 24.

In the present embodiment, a portion 25 surrounding the connector 24 at the battery receiving surface 21 and on the peripheral wall 22 in the battery pack loading section 20 is constituted of a raised portion 25 that is raised toward the battery pack 10 to be mounted by a predetermined height.

In this manner, the portion 25 surrounding the connector 24 at the battery receiving surface 21 and on the peripheral wall 22 in the battery pack loading section 20 is constituted of the raised portion 25 that is raised toward the battery pack 10 to be mounted. Consequently, it is possible to reduce a risk of water immersion into the connector 24 through the surroundings of the raised portion 25 surrounding the connector 24.

In the meantime, as shown in FIG. 8 to FIG. 11, a sealing member 15 (i.e., a sealant) surrounding the battery terminal 14 is disposed at a portion corresponding to the raised portion 25 on the side 10a of the battery pack 10 in the state in which the battery pack 10 is loaded in the battery pack loading section 20. The sealing member 15 is made of a material having a predetermined elasticity and a predetermined sealing property, such as a polyurethane resin.

In the state in which the battery pack 10 is loaded in the battery pack loading section 20, the sealing member 15 surrounding the battery terminal 14 of the battery pack 10 abuts against the raised portion 25 surrounding the connector 24 of the battery pack loading section 20. As a result, the sealing function of the sealing member 15 can produce a high waterproofing effect.

In this case, a relatively simple configuration in which the portion 25 surrounding the connector 24 on the battery receiving surface 21 and on the peripheral wall 22 in the battery pack loading section 20 is formed so as to be raised toward a battery, and the sealing member 15 surrounding the battery terminal 14 is disposed on a portion at the battery pack 10, corresponding to the projection 25 can produce the waterproof effect by a relatively easy battery loading operation in which the connector 24 at the battery pack loading section 20 and the battery terminal 14 at the battery pack 10 are positioned to each other so as to dispose the battery pack 10.

Moreover, in the present embodiment, as shown in FIG. 8 to FIG. 10, a pair of protrusions 16 protruding toward the recess 23 when the battery pack 10 is loaded in the battery pack loading section 20 are formed between the battery terminal 14 and the sealing member 15 in the battery pack 10. When the battery pack 10 is loaded in the battery pack loading section 20, the protrusions 16 and 16 are designed to be positioned between the peripheral edge of the recess 23 and the connector 24 in the battery pack loading section 20.

As a consequence, when the battery pack 10 is loaded in the battery pack loading section 20, the motion of the battery terminal 14 is guided by the protrusions 16 and 16, thus effectively preventing damage from being caused by the interference of the battery terminal 14 with the connector 24 of the battery pack loading section 20.

Additionally, as shown in FIG. 7 to FIG. 9 and FIG. 11, in the present embodiment, triangular grooves 17 and 18 having inclined surfaces 17a and 18a (see FIG. 11), respectively, are formed at each of the pair of side surfaces 12 perpendicularly crossing the side 10a where the battery terminal 14 of the battery pack 10 is disposed. The inclined surfaces 17a and 18a are set to have a downward gradient toward the side 10a in a position in which the battery pack 10 is loaded in the battery pack loading section 20 (see FIG. 5). In the meantime, engagement guide portions (i.e., guide ribs) 27 and 28 that engage with the inclined surfaces 17a and 18a of the grooves 17 and 18 are formed at portions corresponding to the grooves 17 and 18 on the peripheral wall 22 of the battery pack loading section 20. These guide ribs 27 and 28 extend in a depth direction of the battery pack loading section 20. When the battery pack 10 is loaded in the battery pack loading section 20, the inclined surfaces 17a and 18a engage with the guide ribs 27 and 28, respectively, thereby the battery pack 10 is guided toward the side 10a.

In this manner, when the battery pack 10 is loaded in the battery pack loading section 20, the inclined surfaces 17a and 18a of the grooves 17 and 18 formed at the side surfaces of the battery pack 10 engage with the guide ribs 27 and 28 formed on the peripheral wall 22 of the battery pack loading section 20, respectively, so that the battery pack 10 is pushed along the inclined surfaces 17a and 18a toward the side 10a, on which the battery terminal 14 is disposed. This is because the inclined surfaces 17a and 18a in contact with the guide ribs 27 and 28 are inclined downward of the side 10a, so that the resultant force exerted on the battery pack 10 acts on the side 10a. In other words, without any special intention by a user, the tips of the guide ribs 27 and 28 partly abut against the inclined surfaces 17a and 18a, so that the force can be exerted in a proper direction in which the sealing member 15 of the battery pack 10 abuts against the raised portion 25 of the battery pack loading section 20. A stress acting between the guide ribs 27 and 28 and the inclined surfaces 17a and 18a becomes the strongest when the battery pack 10 is placed on the battery pack loading section 20, because the inclined surfaces 17a and 18a definitely restrict movement in directions other than the side 10a. As a result, in the state in which the battery pack 10 is placed on the battery pack loading section 20, the effect produced by the inclined surfaces 17a and 18a and the guide ribs 27 and 28 can apply a stable pressure between the sealing member 15 and the raised portion 25.

Moreover, a water drain path for allowing the battery receiving surface 21 and the outside of the battery pack loading section 20 to communicate with each other may be formed on a part of the peripheral wall 22 of the battery pack loading section 20.

Figure 12:
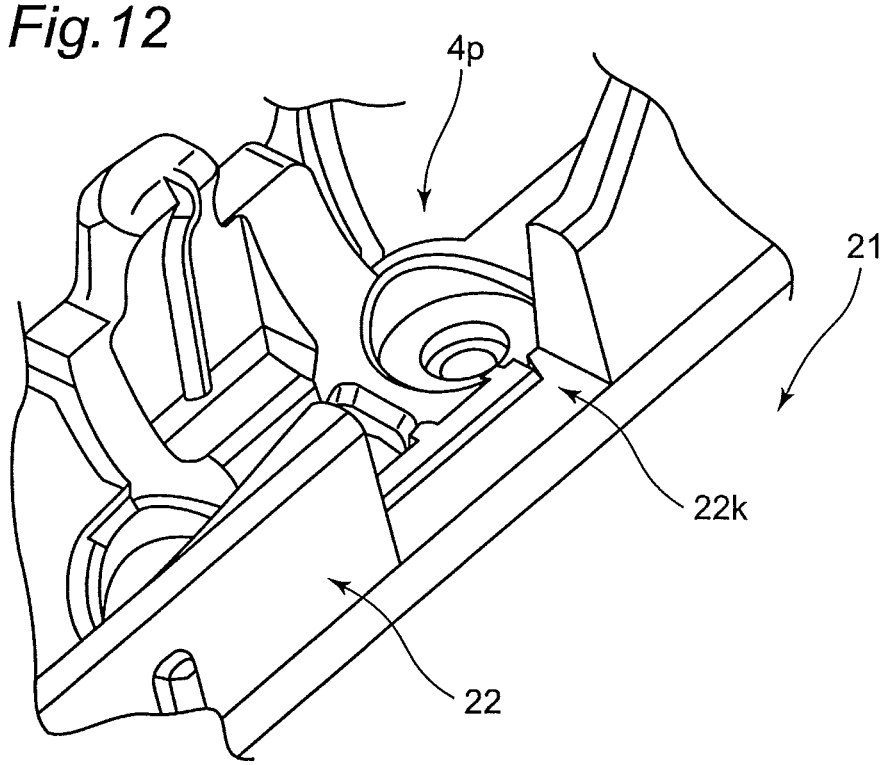
FIG. 12 is a perspective view illustrating an example of a water draining structure in the battery pack loading section.

As shown in FIG. 12, for example, a notch 22k is formed by cutting a part of the peripheral wall 22 corresponding to a portion at which a pen containing portion 4p (see FIG. 3, FIG. 4, and FIG. 6) is disposed at the back surface of the casing 1, so that the pen containing portion 4p positioned outside of the battery pack loading section 20 and the battery receiving surface 21 are allowed to communicate with each other, thus obtaining a water drain path. In this manner, in the case where water stays on the battery receiving surface 21 of the battery pack loading section 20, the staying water can be drained to the outside of the battery pack loading section 20 (i.e., the pen containing portion 4p) through the water drain path 22k. Furthermore, in this case, the tablet terminal device W is reversely turned into a state shown in FIG. 1 and FIG. 2, so that the water staying in the pen containing portion 4p can be drained outside of the device W.

As described above, the present embodiment has been described as an example of the technique of the present disclosure. For the purpose of this, the attached drawings and the detailed explanation have been provided.

As a consequence, the constituent elements in the attached drawings and the detailed explanation include not only constituent elements essential for solving a problem to be solved but also constituent elements that are just essential for illustrating the technique but inessential for solving a problem to be solved. Although such inessential constituent elements appear in the attached drawings and the detailed explanation, the inessential constituent elements are not regarded as being essential.

Although the above-described embodiment has been applied to the so-called tablet terminal device, the electronic device according to the present disclosure is not limited to this embodiment but can be effectively applied to other various kinds of electronic devices.

In this manner, the above-described embodiment is adapted only to illustrate the technique according to the present disclosure, and therefore, it can be variously changed, replaced, added, and omitted within the scope of claims or its equivalent scope.

INDUSTRIAL APPLICABILITY

The present disclosure is applicable to the electronic device with the detachable battery.

What is claimed is:

1. An electronic device, comprising:
a casing; and
a battery, the battery being detachable from the casing;
the casing defining a battery loading section in which the battery is loaded, the battery loading section including a battery receiving surface that receives the battery and a wall portion that is formed to be perpendicular to the battery receiving surface and faces a surface of the battery, wherein
a connector, electrically connected to a battery terminal of the battery loaded in the battery loading section, is disposed on the wall portion,
a raised portion is raised toward the battery and extends around a periphery of the connector, wherein the raised portion is formed on the battery receiving surface and on the wall portion, and
the battery includes an elastic sealing member extending around a periphery of the battery terminal and sealing with the battery loading section when the battery is loaded in the battery loading section, wherein the battery terminal is electrically connected to the connector when the battery is loaded in the battery loading section.

2. The electronic device according to claim 1, wherein the electronic device is a tablet terminal device.

3. The electronic device according to claim 2, wherein the tablet terminal device includes first and second major surfaces, a display screen being on a side corresponding to the first major surface, the battery loading section being disposed on a side corresponding to the second major surface that is opposite the display screen.

4. The electronic device according to claim 1, wherein a major surface of the battery serves as an outer surface of the casing.

* * * * *